(12) United States Patent
Quaderer et al.

(10) Patent No.: US 11,230,325 B2
(45) Date of Patent: Jan. 25, 2022

(54) PANEL CONNECTOR DEVICES

(71) Applicant: Zephyros, Inc., Romeo, MI (US)

(72) Inventors: Dean Quaderer, Livonia, MI (US);
David Kosal, Richmond, MI (US);
Kurt Lilley, Beverly Hills, MI (US);
Blake Synnestvedt, Birmingham, MI (US);
Kevin Hicks, Harrison Township, MI (US); Thomas Kleino, Rochester Hills, MI (US)

(73) Assignee: Zephyros, Inc., Romeo, MI (US)

( * ) Notice: Subject to any disclaimer, the term of this patent is extended or adjusted under 35 U.S.C. 154(b) by 637 days.

(21) Appl. No.: 14/078,680

(22) Filed: Nov. 13, 2013

(65) Prior Publication Data

US 2014/0134361 A1    May 15, 2014

Related U.S. Application Data

(60) Provisional application No. 61/726,163, filed on Nov. 14, 2012.

(51) Int. Cl.
| | |
|---|---|
| *B65D 6/32* | (2006.01) |
| *B65D 6/00* | (2006.01) |
| *B62D 29/04* | (2006.01) |
| *B62D 27/02* | (2006.01) |

(52) U.S. Cl.
CPC ......... *B62D 29/045* (2013.01); *B62D 27/026* (2013.01); *Y10T 428/13* (2015.01)

(58) Field of Classification Search
CPC .... B62D 29/045; B62D 27/026; B62D 21/20; B62D 25/02; Y10T 428/13; F16B 5/0008; F16B 5/0072; F16B 5/0084; F16B 5/0088; F16B 5/01; F16B 5/0642; F16B 7/00; F16B 7/02; F16B 7/042; F16B 7/0433; F16B 7/0473; F16B 7/0493; F16B 7/14; F16B 7/1409; E04C 2/34; E04C 2/20
USPC .......... 428/34.1; 296/184.1, 200, 214, 37.14, 296/57.1, 84.1; 52/309.1, 588.1, 745.1, 52/747.1, 15, 172, 204.62, 204.7, 232, 52/235, 255, 28, 309.3, 313, 396.02, 52/404.1, 404.3, 476, 483.1, 506.05, 701, 52/741.3, 745.06, 745.19, 81.1
See application file for complete search history.

(56) References Cited

U.S. PATENT DOCUMENTS

| | | | | |
|---|---|---|---|---|
| 3,190,409 | A | * | 6/1965 | Petterson ............. B62D 27/026 114/88 |
| 4,897,146 | A | * | 1/1990 | Inzinna ......................... 156/462 |
| 5,403,062 | A | * | 4/1995 | Sjostedt ............... B62D 33/046 220/1.5 |
| 5,575,526 | A |  | 11/1996 | Wycech |
| 5,620,794 | A | * | 4/1997 | Burkart .................. B29C 65/76 296/146.15 |

(Continued)

OTHER PUBLICATIONS

Webster's Revised Unabridged Dictionary, 1913, C. & G. Merriam Co., Springfield, Mass., Under the direction of Noah Porter, D.D., LL.D.*

(Continued)

*Primary Examiner* — Yan Lan
(74) *Attorney, Agent, or Firm* — The Dobrusin Law Firm, PC

(57) ABSTRACT

A device and method for the protection of a first member and second member from corrosion by utilizing a connector that bonds the members without allowing direct contact of the members.

20 Claims, 2 Drawing Sheets

(56) References Cited

U.S. PATENT DOCUMENTS

| | | |
|---|---|---|
| 5,755,486 A | 5/1998 | Wycech |
| 5,766,719 A | 6/1998 | Rimkus |
| 5,884,960 A | 5/1999 | Wycech |
| 5,932,680 A | 8/1999 | Heider |
| 6,131,897 A | 10/2000 | Barz et al. |
| 6,314,704 B1 | 11/2001 | Bryant |
| 6,348,513 B1 | 2/2002 | Hilborn et al. |
| 6,368,438 B1 | 4/2002 | Chang et al. |
| 6,811,864 B2 | 11/2004 | Czaplicki et al. |
| 6,941,719 B2 | 9/2005 | Busseuil et al. |
| 7,125,461 B2 | 10/2006 | Czaplicki et al. |
| 7,152,909 B2 | 12/2006 | Booher |
| 7,199,165 B2 | 4/2007 | Kassa et al. |
| 7,249,415 B2 | 7/2007 | Larsen et al. |
| 7,313,865 B2 | 1/2008 | Czaplicki et al. |
| 7,993,719 B2 | 8/2011 | Stanton |
| 2004/0076831 A1 | 4/2004 | Hable et al. |
| 2006/0249977 A1* | 11/2006 | Stephenson ............ B62D 33/04 296/104 |
| 2007/0193171 A1* | 8/2007 | Finerman et al. .............. 52/459 |
| 2008/0029200 A1 | 2/2008 | Sheasley |
| 2009/0146454 A1* | 6/2009 | Riley et al. ................ 296/186.1 |
| 2010/0140980 A1* | 6/2010 | Stanton .................... 296/203.01 |

OTHER PUBLICATIONS

Ishikawa (Ishikawa, et al., "Bond strength and disbanding behavior of elastomer and emulsion-type dismantlable adhesives used for building materials," Int. J. Adhesion and Adhesives, 25, 2005, p. 193-199).*

Will (Will, et al., Specialty chemical update program, "Adhesives and sealants," Dec. 2009, IHS, p. 1-204).*

* cited by examiner

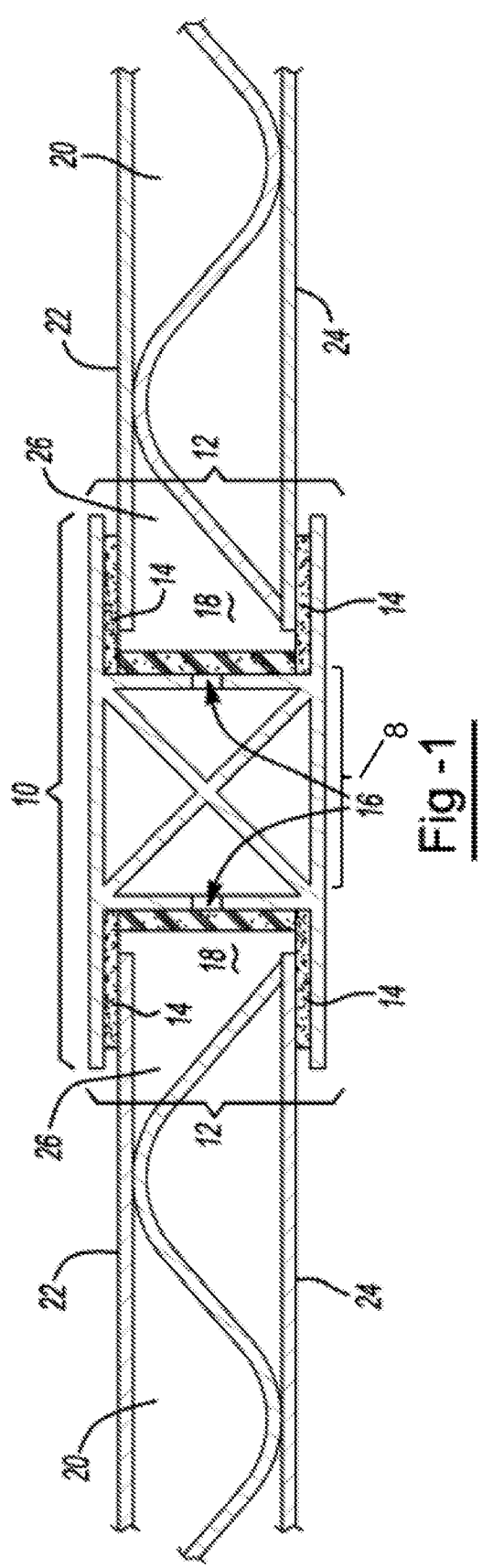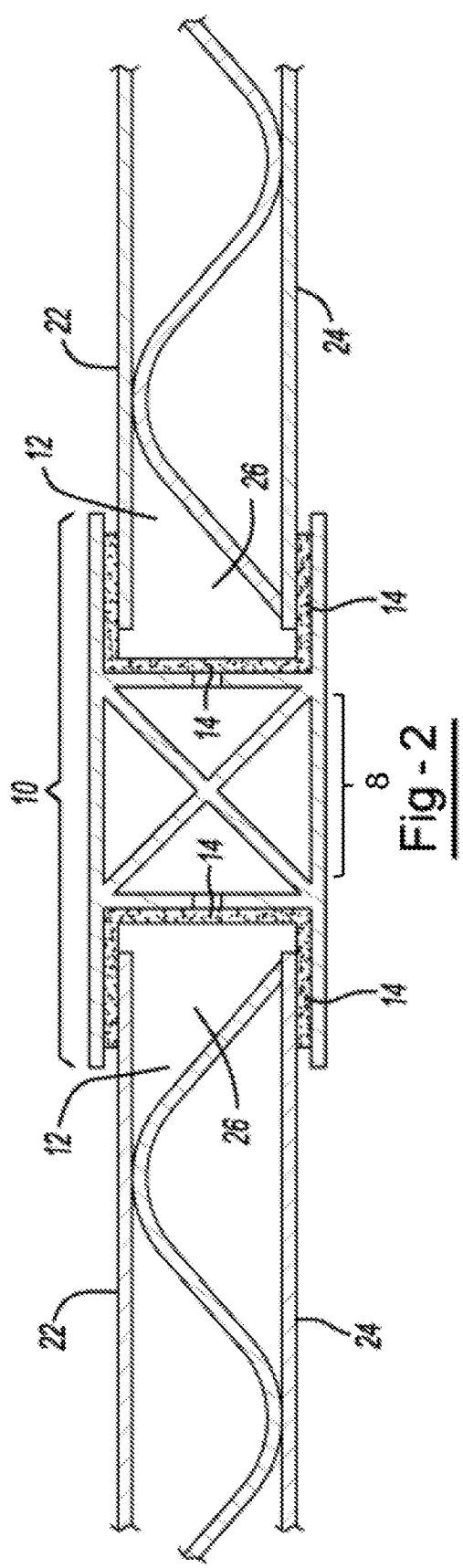

PANEL CONNECTOR DEVICES

FIELD OF THE INVENTION

The present teachings are predicated upon methods and devices for the connection of panel structures including a joint having a channel for receiving at least a portion of a panel and an adhesive sealant material located within the channel.

BACKGROUND OF THE INVENTION

Truck trailer construction presents a number of challenges related to connecting side wall panels, repair of side wall panels and corrosion. Generally, adjacent panels are connected with many rivets that make both construction and repair of the panels time consuming and labor intensive.

U.S. Pat. No. 7,993,719 discloses a mass transit vehicle formed of composite panels, releasable adhesive joints. U.S. Pat. No. 7,152,909 teaches a trailer body including wall and floor panels including an I-beam post/cross-member defined in an extrusion profile. U.S. Pat. No. 6,314,704 teaches a structural building panel including a composite truss member having transverse truss elements, first and second composite skins, and a composite connector extends along a side edge of the panel.

There remains a need for connectors that reduce the need for mechanical fasteners for connecting trailer side wall panels and also provide for repair ease and minimized corrosion.

SUMMARY OF THE INVENTION

The present invention meets some or all of the above needs by providing a profile for use in a joint for connecting adjoining structural members comprising a central portion that is generally tubular; at least one pair of spaced apart opposing flanges defining a channel; and an adhesive sealant that is present on the profile within the channel in a green state and which is adapted to be activated by a pre-selected condition for bonding to and sealing at least one structural member.

The adhesive sealant may be expandable. The adhesive sealant may be expanded in place. The adhesive sealant may be heat activated. The profile may be adapted for allowing removal and replacement of the adjoining structural members. The profile may be formed of a single material. The profile may be formed of more than one material. The profile may be extruded. The profile may be pultruded. The profile may include an aluminum material. The profile may include a steel material. The profile may include a polymeric material. The profile may include a glass-reinforced polymeric material. The profile may be a one-piece member. The profile may be a two-piece member. The adhesive sealant may be an epoxy-based material. The adhesive sealant may have a $T_g$ that differs from that of any adhesive located on the adjoining structural members so that any de-bonding process de-bonds only the adhesive sealant and not the adhesive on the adjoining structural members. The adjoining structural members may include a corrugated material. The adhesive sealant may fill gaps along a terminal edge of the corrugated material. The adhesive sealant may fill gaps along a terminal edge of the adjoining structural members. The profile may be adapted for receiving substantially planar adjoining structural members. The adjoining structural members may include opposing skins and an intermediate layer. The shape of the profile may prevent the adhesive sealant from expanding over an edge of the adjoining structural members. The adhesive sealant may be located in between the profile and any adjoining structural member so there is no direct contact between the profile and any adjoining structural member.

The present teaching further provide for a panel structure for a container, the container including at least two elongated panels and a joint located between the panels and for securing the panels to one another. The joint may have an elongated profile that defines a pair of channels into which the panels are placed and in which an activated adhesive sealant resides between the panels and the profile for adhesively bonding and sealing the panels and the profile to one another. The elongated profile in cross section may have a configuration that includes a central portion that is generally tubular and includes at least one pair of spaced apart opposing flanges defining a channel.

The adhesive sealant utilized in the panel structure may be expandable. The adhesive sealant may be expanded in place. The adhesive sealant may be heat activated. The joint may be adapted for allowing removal and replacement of the panels. The elongated profile may be formed of a single material. The elongated profile may be formed of more than one material. The elongated profile may be extruded. The elongated profile may be pultruded. The elongated profile may include an aluminum material. The elongated profile may include a steel material. The elongated profile may include a polymeric material. The elongated profile may include a glass-reinforced thermoplastic material. The elongated profile may be a one-piece member. The elongated profile may be a two-piece member. The adhesive sealant may be an epoxy-based material. The adhesive sealant has a $T_g$ that differs from that of any adhesive located on the panels so that any de-bonding process de-bonds only the adhesive sealant and not the adhesive on the adjoining structural members. The panels may include a corrugated material. The adhesive sealant may fill gaps along a terminal edge of the corrugated material. The adhesive sealant may fill gaps along a terminal edge of the panels. The elongated profile may be adapted for receiving substantially planar panels. The panels may include opposing skins and an intermediate layer. The shape of the profile may prevent the adhesive sealant from expanding over an edge of the panel. The adhesive sealant may be located in between the profile and any portion of the panel so there is no direct contact between the profile and any portion of the panel.

The present teachings also provide for a hollow container comprising a pair of spaced apart opposing longitudinal extending upper rails, a pair of spaced apart opposing longitudinal extending lower rails that are generally parallel to one another and a plurality of posts extending between respective upper and lower rails and being arranged generally parallel relative to each other. The hollow container may further include a plurality of roof bows generally perpendicular to the posts and spanning between the opposing upper rails and generally parallel to one another and a roof supported on the roof bows. A plurality of side wall panels between successive posts and being connected to the posts with an adhesive sealant that has been activated in place for adhesion and sealing may also be included.

The posts may be adapted for allowing removal and replacement of the panels. The posts may be formed of a single material. The posts may be formed of more than one material. The posts may be extruded or pultruded. The posts may include an aluminum material. The posts may include a steel material. The posts may include a polymeric material. The posts may include a glass-reinforced thermoplastic material. The posts may comprise a one-piece member. The posts may comprise a two-piece member. The panels may include a corrugated material. The posts may be adapted for receiving substantially planar panels. The shape of the posts may prevent the adhesive sealant from expanding over an edge of the panel. The adhesive sealant may be located in between the posts and any portion of the panel so there is no direct contact between the posts and any portion of the panel.

The present teaching further provide for a method of making the profile reference herein including co-extruding a pair of spaced apart opposing flanges defining a channel and an adhesive sealant so that the adhesive sealant is present within the channel in a green state and is adapted to be activated by a pre-selected condition for bonding to and sealing at least one structural member.

The teachings herein also provide for a method of making the panel structure described herein comprising forming at least two elongated panels, locating a joint between the panels for securing the panels to one another, locating the at least two elongated panels into a pair of channels forming the joint and activating an adhesive sealant residing between the panels and the profile for adhesively bonding and sealing the panels and the joint to one another.

The teachings herein also provide for a method of repairing the panel structure described herein including de-bonding an adhesive sealant located in a pair of channels, removing an elongated panel from within the pair of channels and replacing the elongated panel with a second elongated panel or a repaired panel.

The adhesive sealant may be activated after extruding the adhesive sealant within the channel. The de-bonding may occur with the application of heat.

The connector system of the present teachings provides an opportunity to integrate lightweight parts with high-strength metallic panels while avoiding the corrosion that generally occurs upon extended contact between the metallic panels. The connector is shaped to include channel portions having an activatable adhesive material located within the channel portions. Edge portions of adjacent panels can be located within the channels so that a connection is maintained between adjacent panels without direct contact between the panels.

BRIEF DESCRIPTION OF THE DRAWINGS

FIG. 1 is a cross-sectional view of a connector and panels in accordance with the present teachings, FIG. 2 is a cross-sectional view of two connectors and associated panels in accordance with the present teachings.

DETAILED DESCRIPTION

Figure 3:
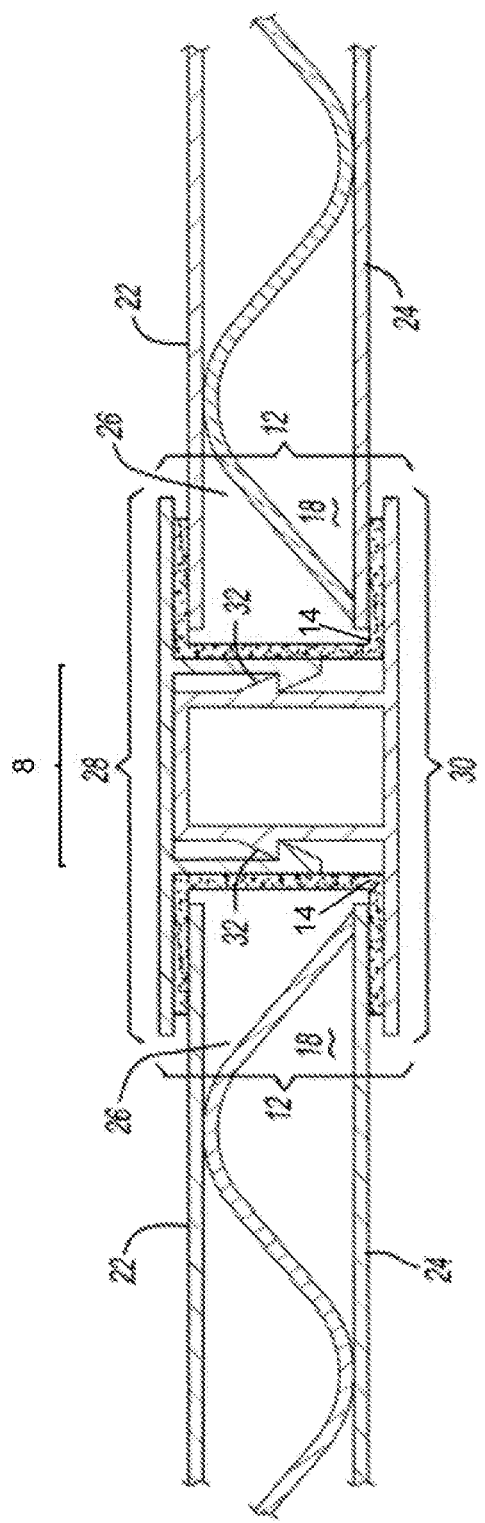
FIG. 3 is a cross-sectional view of a connector and panels in accordance with the present teachings.

This application is related to and claims the benefit of the filing date of U.S. Provisional Application Ser. No. 61/726,163 filed Nov. 14, 2012, the contents of this application being hereby incorporated by reference for all purposes.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The connector system (e.g., joint system, panel structures) of the present teachings provides a connector (e.g., a profile or post) including a channel portion and an activatable adhesive located in the channel. One or more panels (e.g., structural members) may be located into the channel portion and in contact with the activatable adhesive. The connector system may be utilized to form a hollow container.

The profile (e.g., channel portion) may include one or more surfaces for receiving the activatable adhesive, which may be an adhesive sealant, an expandable material, or any combination thereof. The channel may be formed so that it includes an opening for receiving a structural member, which may be a panel. The profile's surfaces may include a pair of spaced apart opposing flanges (e.g., first and second walls) which may be arranged substantially parallel to one another. The profile's surfaces may include a third wall intermediate the first and second wall that may be arranged substantially perpendicular to the first and second walls. The surfaces of the profile may be substantially planar surfaces. The surfaces may include features that result in a variable topography along the surfaces of the profile.

An activatable material, which may be an adhesive material, a sealant material, an expandable material, or any combination thereof, may be located onto one or more of the profile's surfaces. The same activatable material may be located onto each surface. A different activatable material may be located onto each surface. The first and second walls may receive one activatable material, while the third wall receives an activatable material that is dissimilar to that located onto the first and second walls. One or more walls may receive an adhesive material while one or more adjacent walls may receive an expandable material. The adhesive material may or may not expand upon activation. The expandable material may or may not adhere upon activation.

The profile may be formed as a one-piece unitary member, such that each member forms two channel portions, each for receiving a structural member and/or acting to connect two or more structural members. Alternatively, the profile may be formed of two or more pieces that are arranged relative to one another to form the necessary channel portions. The two or more pieces may thus be connected to one another by means of an adhesive, which may be the same adhesive located onto the profile's surfaces or may be a different adhesive. The two or more pieces may be connected to one another via a mechanical fastener. The profiles may be formed to connect two or more structural members, which may be panel members.

The structural members may be metallic members. The first member and second member are generally dissimilar metallic members. One of the first or second member may be composed of aluminum, extruded aluminum, aluminum foam, magnesium, magnesium alloys, molded magnesium alloys, titanium, titanium alloys, molded titanium alloys, nickel, copper, transition metals, polyurethanes, polyurethane composites, or any combination thereof. One of the first or second member may be a steel member.

The connector includes a carrier which may be formed of a polymeric material. The carrier, including the walls and the ribs of the carrier may be integrally molded (e.g., injection molded) or formed of a single material that is different from the material of one or more of the first member, the second member, or the expandable adhesive material. Suitable materials can include for example, and without limitation, a polymeric material such as nylon, polyamide, polyester, polypropylene, polyethylene, molding compound or the like, which may be filled or unfilled (e.g., filled with glass or kevlar reinforcement fibers).

One function of the connector, in addition to separating the first and second members, is to provide a structural member that carries the structural adhesive material. The carrier may thus be contacted with one or more structural adhesive materials which may be expandable materials. Thus, the carrier may include one or more outward facing surfaces onto which a layer of the expandable material is placed. The expandable material may be applied to the surface of the carrier (prior to expansion) at such locations. Optionally, the direction of expansion may be controlled by one or more extensions formed on the carrier, such as those disclosed in U.S. Pat. No. 6,941,719. The expandable material may be formed onto one or more corners of the carrier. One or more spaces formed in between the first member and second member may be of insufficient size to fit the expandable material in its unexpanded state. The carrier may thus be formed to guide the expandable material from its location on the corner portions of the carrier into the small clearances formed adjacent the corner portions between the first member and second member. The inclusion of the expandable adhesive into these small clearances provide improved strength of adhesion between the first and second members by virtue of the thin bondline formed by the adhesive expanding to these thin openings. The carrier may be substantially rectangular in shape and may thus include a top surface, a bottom surface, two side surfaces, a front surface and a back surface. Each of these surfaces may be formed of one or more openings, rib structures, solid surfaces, or combinations thereof. Thus, one or more areas directly adjacent (e.g., in direct planar contact with) the top surface, the bottom surface or the two side surfaces may be free of any expandable material in its unexpanded state, Upon activation of the expandable material, the expandable material may foam and extend into the areas directly adjacent one or more of the top surface, the bottom surface, or the two side surfaces.

One or more of the adhesive and/or the expandable material may be an epoxy based material such as those disclosed in U.S. Pat. Nos. 5,884,960; 6,348,513; 6,368,438; 6,811,864; 7,125,461; 7,249,415; and U.S. Patent Publication Nos. 2004/0076831, and 2008/0029200 hereby incorporated by reference for all purposes. The expandable material and/or adhesive material may be generally shaped in a rectangular or block configuration, but may also be shaped as needed or desired depending upon the configuration of the carrier. As an example, the expandable and/or adhesive material may be polygonal in shape and formed along the corner portions of the carrier. More specifically, the expandable material and/or adhesive material may be pentagonal in shape and aligned along one or more corners of the carrier. Of course, it is contemplated that the material may be applied to carrier as a single piece (e.g., strip) or multiple pieces (e.g., strips). Upon expansion the expandable material and/or adhesive material may expand vertically initially until contacting any barrier at which point the expandable material may begin to expand in a horizontal direction, thus contacting one or more of the top surface, bottom surface or two side surfaces of the carrier. The expandable material and/or adhesive material may be able to expand into any gap with a width larger than about 0.5 mm. The expandable material and/or adhesive material may be able to expand into any gap with a width larger than about 1 mm.

The expandable material and/or adhesive material may be a resinous generally dry to the touch or tacky and may be shaped in any form of desired pattern, placement, or thickness, but is preferably of substantially uniform thickness. Though other heat-activated materials are possible for the expandable material, a preferred heat activated material is an expandable polymer or plastic, and preferably one that is foamable. The expandable material may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125, 461; and 7,199,165 incorporated by reference herein for all purposes. For example, and without limitation, the expandable material may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104.

The expandable material and/or adhesive material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material and/or adhesive material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat)

and, for paint shop applications, are commonly about 93.33° C. (about 200° F.) or slightly higher (e.g., 120° C.-150° C.).

The components of the connector may be arranged in a variety of configurations. As shown for example in FIG. 1, the connector 10 includes a central portion 8 and a channel portion 12, the channel portions including an adhesive 14 and an expandable material 16 located therein. A connecting portion 18 of a panel structure 20 may be located within the channel portion 12 so that the connecting portion contacts the adhesive 14 along a first surface 22 and second surface 24 of the panel and contacts the expandable material 16 along a side edge 26 of the panel.

Alternatively, and as shown for example at FIG. 2, the connector 10, includes a channel portion 12 having only an adhesive 14 located within the channel. Each of the first surface 22, second surface 24, and side edge 26 of the panel structure 20 contacts the adhesive 14.

The connector may also be formed of a two-piece member as shown for example at FIG. 3. The connector may include a first portion 28 and a second portion 30, such that the first portion receives the second portion and forms an interface 32 between the first and second portion. The connection of the first portion 28 and second portion 30 forms a channel portion 12 for receiving a connecting portion 18 of the panel structure 20. As such, the adhesive 14 is located in the interface 32 between the first portion 28 and second portion 30 of the connector. The adhesive 14 is also located within the channel portion 12 so that the adhesive contacts the first surface 22, second surface 24, and side edge 26 of the panel structure 20.

Figure 4:
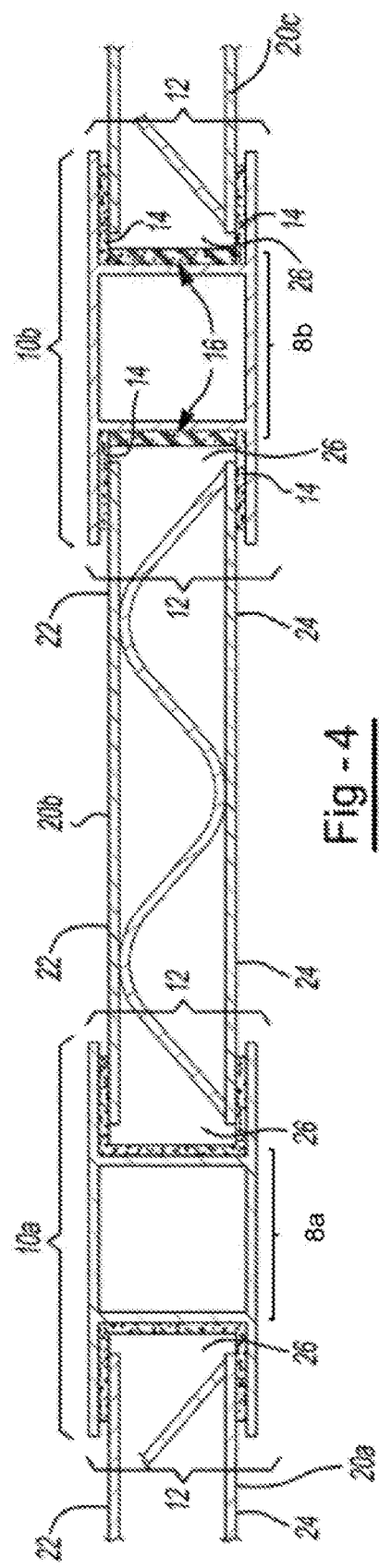
FIG. 4 is a cross-sectional view of a connector and panels in accordance with the present teachings.

The connectors may also be used in series such that adjacent connectors may have differing arrangements. As shown for example at FIG. 4, a first panel structure 20 a, second panel structure 20 b and third panel structure 20 c may be aligned and connected via a first connector 10 a and a second connector 10 b. The first connector 10 a may be arranged as a one-piece connector and may include a central portion 8a and a channel portion 12 having adhesive 14 located therein. The adhesive 14 may be located within the channel 12 so that it contacts the first surface 22, second surface 24, and side edge 26 of the panel structure 20 a, 20 b. An adjacent connector 10 b may be arranged as a one-piece connector and may also include a central portion 8b and channel portions 12 having adhesive 14 located therein. The adhesive 14 contacts the first surface 22 and second surface 24 of the panel structure 20, and an expandable material 16 is also located within the channel portion 12, hut contacts the side edge 26 of the panel structure 20 b, 20 c.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A panel structure for a container comprising:
   at least two elongated panels including a panel adhesive located thereon;
   a panel connector located between the at least two elongated panels for securing the at least two elongated panels to one another, the panel connector having an elongated profile that defines a pair of channels into which the at least two elongated panels are placed and in which an adhesive sealant material resides for adhesively bonding and sealing the at least two elongated panels and the panel connector to one another;
   wherein the elongated profile in cross section has a configuration that includes a central portion that is tubular and includes spaced apart opposing flanges defining two channels;
   wherein the adhesive sealant is located in between the elongated profile and the at least two elongated panels so the elongated profile is free from direct contact with any portion of the at least two elongated panels;

wherein the panel adhesive has a $T_g$ that differs from a $T_g$ of the adhesive sealant so that the adhesive sealant is debondable by the application of heat so that the joint allows for removal and replacement of one or more of the at least two elongated panels without debonding the elongated panels and the panel adhesive.

2. The profile of claim 1, wherein the adhesive sealant is expandable.

3. The profile of claim 1, wherein the elongated profile is extruded.

4. The profile of claim 1, wherein the elongated profile includes an aluminum material, a steel material, or any combination thereof.

5. The profile of claim 1, wherein the elongated profile includes a glass-reinforced polymeric material.

6. The profile of claim 1, wherein the adhesive sealant is an epoxy-based material.

7. The panel structure of claim 1, wherein the at least two elongated panels include opposing skins and an intermediate layer.

8. The panel structure of claim 1, wherein a shape of the elongated profile prevents the activated adhesive sealant from expanding over an edge of the at least two elongated panels.

9. The profile of claim 1, wherein the connector is a one-piece member.

10. The profile of claim 1, wherein each of the channels includes an expandable material.

11. A joint system comprising:
   a) two or more connectors, each connector including:
      i) a central portion that is tubular and includes opposing side edges;
      ii) a first flange and a second flange, the first flange and second flange are on the opposing side edges of the central portion, defining a first channel and a second channel on opposing side edges of the central portion; and
      iii) a pair of perpendicular walls, wherein each of the perpendicular walls connect the first flange and the second flange on each of the opposing side edges;
   b) an adhesive sealant located within the channels of the two or more connectors; and
   c) a plurality of structural members which are substantially planar and include a structural member adhesive located thereon;

wherein each of the two or more connectors are adapted for receiving at least two structural members;

wherein the adhesive sealant is located so that there is no direct contact between the channels of the two or more connectors and the plurality of structural members; and wherein the adhesive sealant has a $T_g$ that differs from a $T_g$ of the structural member adhesive so that under a pre-selected temperature any de-bonding process debonds only the adhesive sealant, while the structural member adhesive remains bonded with the at least two adjoining structural members.

12. The panel structure of claim 11, wherein the at least two adjoining structural members include a corrugated material.

13. The panel structure of claim 12, wherein the adhesive sealant fills gaps along a terminal edge of the corrugated material.

14. The joint system of claim 11, wherein the adhesive sealant is expandable.

15. The joint system of claim 11, wherein the structural members are extruded.

16. The joint system of claim 11, wherein the structural members include an aluminum material, a steel material, or any combination thereof.

17. The joint system of claim 11, wherein the structural members include a glass-reinforced polymeric material.

18. The joint system of claim 11, wherein the adhesive sealant is an epoxy-based material.

19. The joint system of claim 11, wherein each connector is a one-piece member.

20. The joint system of claim 11, wherein the adhesive sealant is an ethylene-based material.

* * * * *